United States Patent [19]

Lapiolahti

[11] Patent Number: 4,750,856

[45] Date of Patent: Jun. 14, 1988

[54] CAR CARRIER

[76] Inventor: Risto J. Lapiolahti, 1409 S. N St., Lake Worth, Fla. 33460

[21] Appl. No.: 433

[22] Filed: Jan. 5, 1987

[51] Int. Cl.$^4$ .............................. B60P 1/16; B60P 3/12
[52] U.S. Cl. .................................... 414/563; 414/477; 414/500; 414/478; 280/402; 410/4; 410/29.1
[58] Field of Search ............... 414/469, 475, 480, 482, 414/483, 498, 500, 563, 471, 477, 478; 280/402; 410/4, 7, 13, 14, 15, 24, 26, 29.1

[56] References Cited

U.S. PATENT DOCUMENTS

| 3,467,268 | 9/1969 | Corompt | 414/500 X |
|---|---|---|---|
| 3,613,919 | 10/1971 | Ceepo | 414/563 X |
| 3,638,817 | 2/1972 | Corompt | 414/500 X |
| 4,318,657 | 3/1982 | Znidaric | 414/478 |
| 4,348,054 | 9/1982 | Shonkwiler et al. | 414/471 X |
| 4,456,420 | 6/1984 | Newhard | 414/478 |

FOREIGN PATENT DOCUMENTS

| 986155 | 3/1976 | Canada | 280/402 |
|---|---|---|---|
| 1407262 | 9/1975 | United Kingdom | 280/402 |

Primary Examiner—Robert J. Spar
Assistant Examiner—Vien Nguyen
Attorney, Agent, or Firm—Renner, Otto, Boisselle & Lyon

[57] ABSTRACT

A car carrier having a bed linked to the frame of a truck for movement from a horizontal position on the frame to a tilted car loading or unloading position in a single motion entailing simultaneous upward-rearward movement of the front end of the bed and downward-rearward movement of the rear end of the bed to ground-engaging position. The terminal portion of the tilting movement of the bed automatically compresses the rear springs between the frame and rear axle. The car carrier also has a wheel lift assembly including yokes on a rearwardly extending boom which are lowered to engage and lift the front on rear wheels of a second car responsive to partial tilting of the bed and to return of the bed to horizontal position. The boom and yokes are retracted forwardly to be disposed underneath the rear portion of the bed during loading and unloading of a first car onto or from the bed.

The car carrier also has load balancing wheels rearward of the rear wheels which may be moved down to firm ground engaging position to decrease the load on the rear wheels and to maintain adequate downward pressure on the front wheels for proper steering.

7 Claims, 4 Drawing Sheets

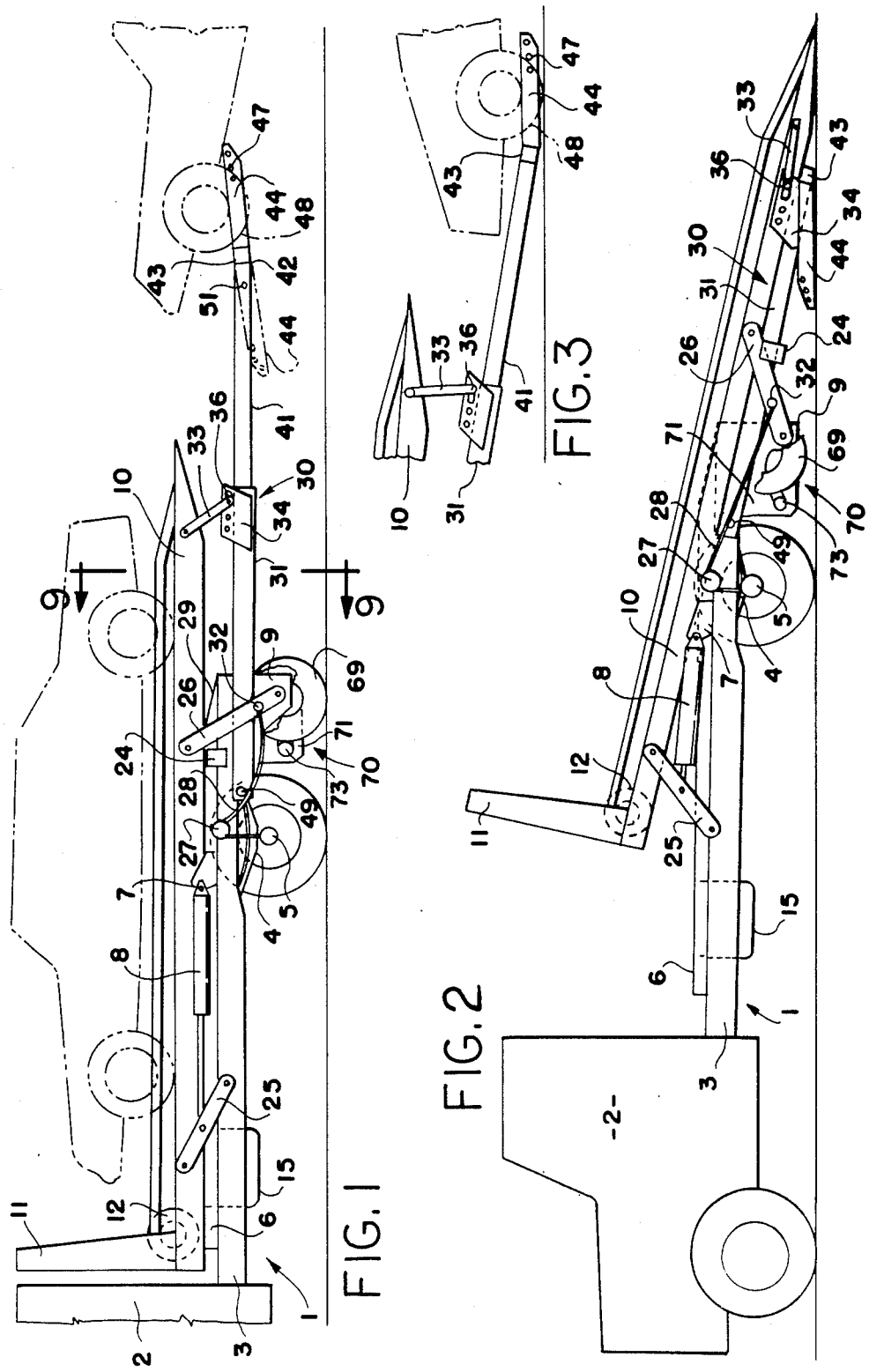

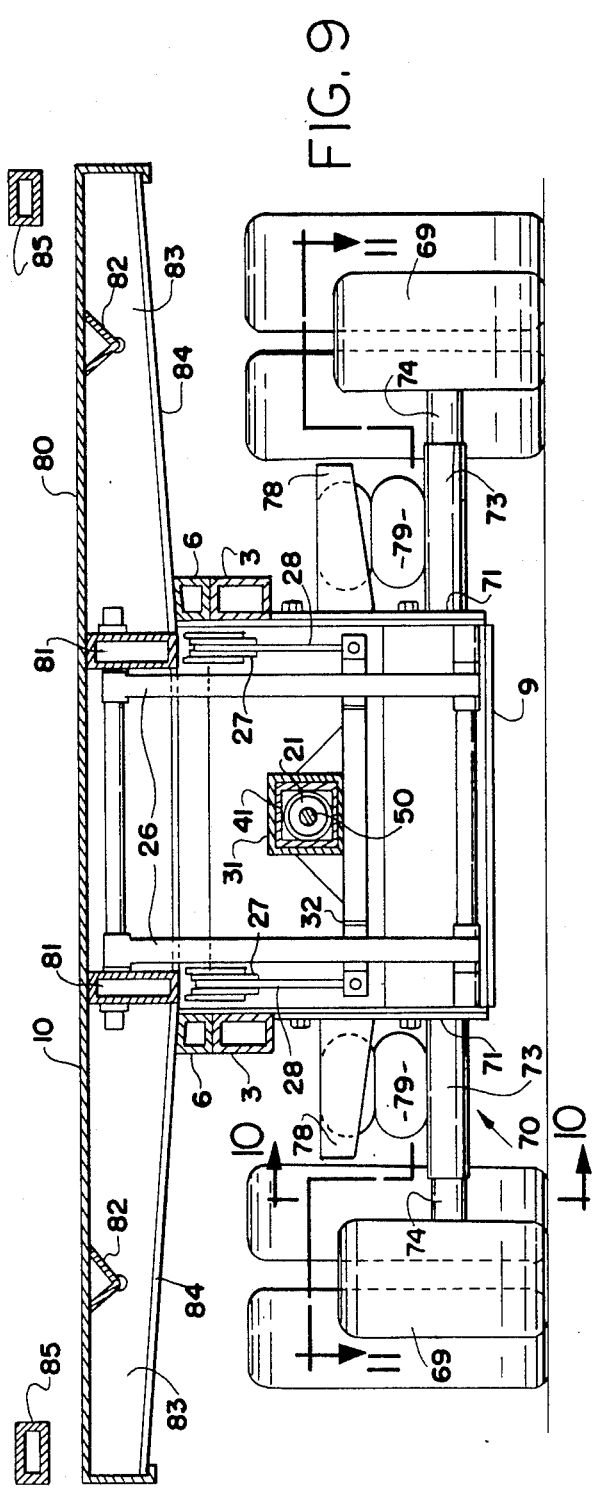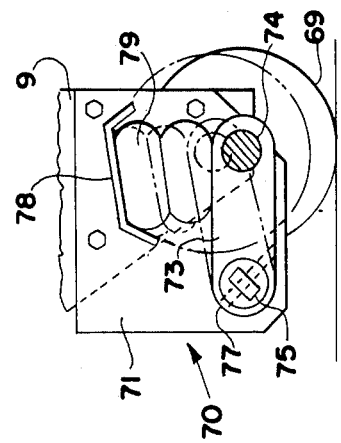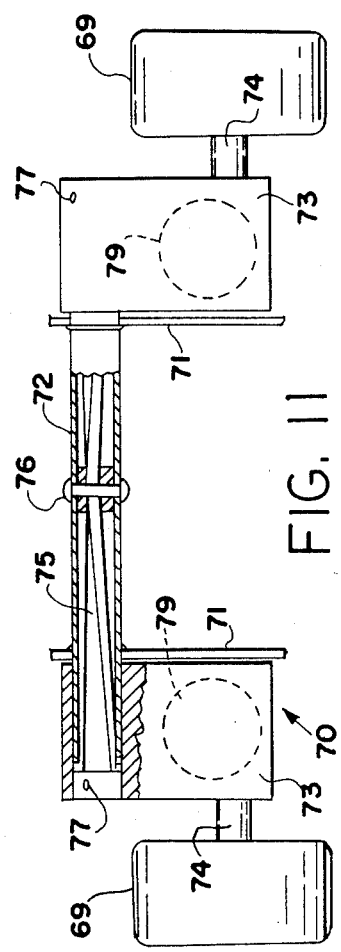

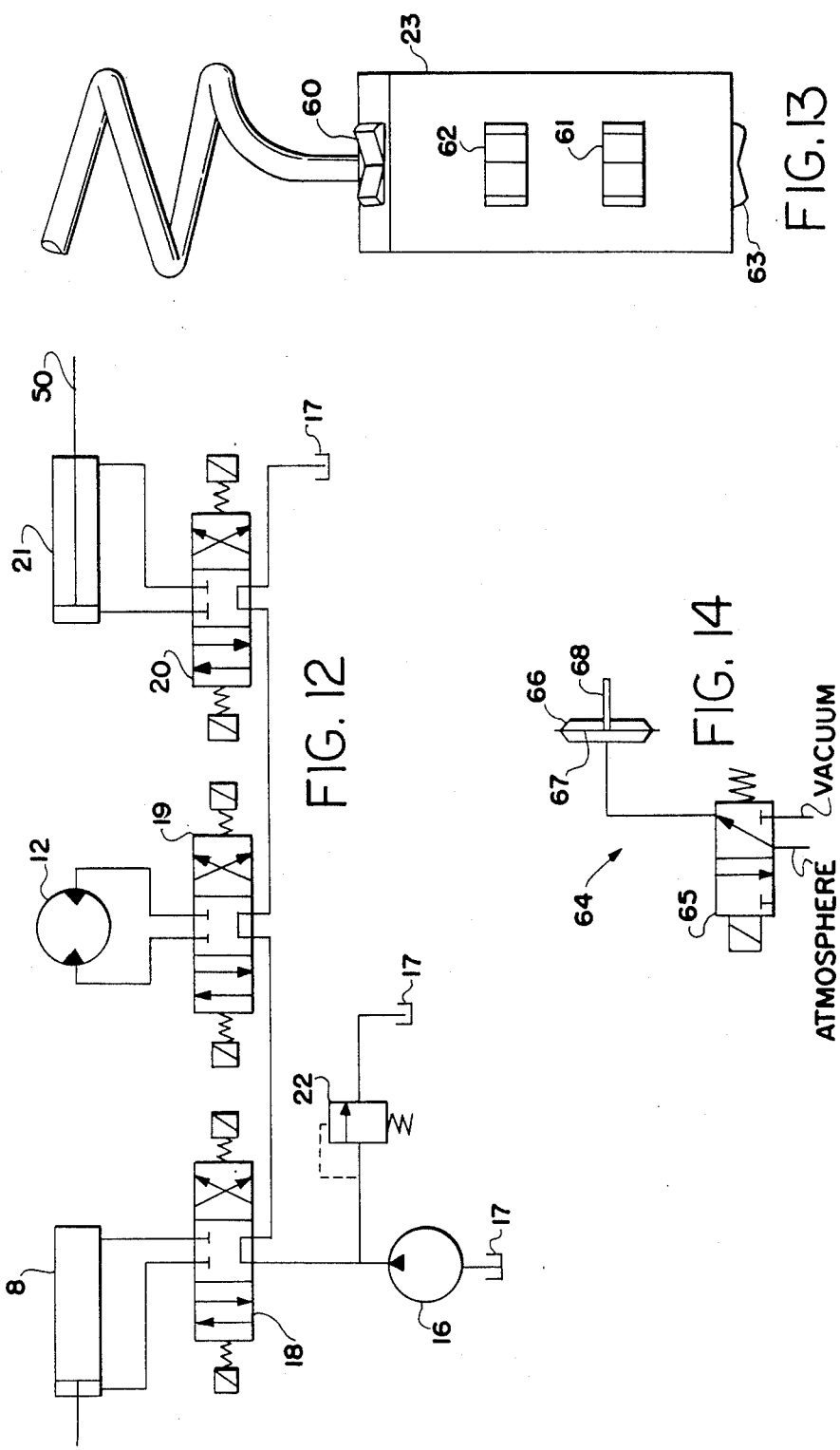

CAR CARRIER

BACKGROUND OF THE INVENTION

In a conventional car carrier a self-propelled truck chassis is equipped with a car carrier bed which is supported for movement from horizontal position on the truck frame first to a slideback position by a long slideback cylinder and then to a tilted position by a pair of tilt cylinders about a fulcrum at the rear end of the truck frame and between the front and rear ends of the bed, the bed in tilted position having its rear end in ground engaging position for loading or unloading of a car onto or from the tilted bed by the car's own power or by a cable winch at the front end of the bed. This car carrier is provided with a sub-frame which has slides or rollers for slideback movement of the bed and which has pivotal connection with the rear end of the truck frame constituting the fulcrum about which the sub-frame and the bed pivot to tilted position with the rear end of the bed in ground engaging position.

It is also known to provide a conventional car carrier with a tow bar and sling assembly of which the front end of the tow bar is pivotally connected to the rear end of the truck frame for lowering and raising the sling at the rear end of the tow bar for engagement with and lifting of the front or rear end of a second car to be towed behind the carrier.

SUMMARY OF THE INVENTION

A car carrier of simple, lightweight, and inexpensive construction characterized in that the car carrier bed is linked by front and rear links to the frame of a self-propelled truck chassis so that a single hydraulic cylinder, when actuated in one direction, shifts the bed from horizontal position on the truck frame to tilted position by simultaneous upward and rearward movement of the front end of the bed and downward and rearward movement of the rear end of the bed to ground engaging position for loading or unloading a car onto or from the tilted bed. The cylinder, when actuated in the opposite direction, shifts the bed from tilted position to horizontal position by simultaneous forward and downward and forward and upward movement of the front and rear ends of the bed.

A car carrier further characterized in that a wheel lift device has a retracted position beneath the rear end portion of the bed from which it is lowered responsive to rearward movement of the bed to tilted position. The wheel lift device has a protracted position whereat wheel engaging yokes thereof extend rearwardly beyond the rear end of the bed, the wheel lift device being lowered to ground-engaging position of the yokes responsive to partial tilting of the bed by actuation of the single cylinder in one direction. The ground engaging yokes are then engaged with the front or rear wheels of a second car to lift the engaged wheels of the second car for towing responsive to return of the bed to horizontal position by actuation of the cylinder in the opposite direction.

A car carrier further characterized in that the springs between the truck frame and the rear axle thereof are automatically compressed in response to approach of the bed to tilted position thereby to lower the rear end of the truck frame; to decelerate the terminal portion of the tilting movement of the bed and to cushion the terminal portion of the stroke of the actuating cylinder; to prevent "spring jump" of the bed when a car is unloaded therefrom; and to decrease the load on the actuating cylinder during the initial portion of movement of the bed from tilted position to horizontal position.

A car carrier further characterized in that load balancing wheels rearward of the rear wheels are movable downwardly to firm groundengaging position to decrease the load on the rear wheels and to maintain adequate downward pressure on the front wheels for proper steering especially when a car is towed on the wheel lift device.

BRIEF DESCRIPTION OF THE DRAWINGS

In the annexed drawings:

FIG. 1 is a side elevation view of a car carrier embodying the present invention;

FIG. 2 is a side elevation view showing the bed of the car carrier in tilted position for loading or unloading a first car thereonto or therefrom;

FIG. 3 is a side elevation view showing the yokes of a wheel lift assembly in ground engaging position;

FIG. 9 is a view along line 9—9 of FIG. 1;

FIGS. 10 and 11 are views taken along lines 10—10 and 11—11 of FIG. 9;

FIG. 12 is a schematic diagram of the hydraulic system employed to operate the car carrier;

FIG. 13 illustrates a hand held control unit for actuating valves for a bed tilt cylinder, a winch, and a wheel lift boom cylinder; and, FIG. 14 is a schematic diagram of a speed increasing device operated by a switch on the control unit of FIG. 13.

DETAILED DESCRIPTION OF THE PREFERRED EMBODIMENT

Figure 4:
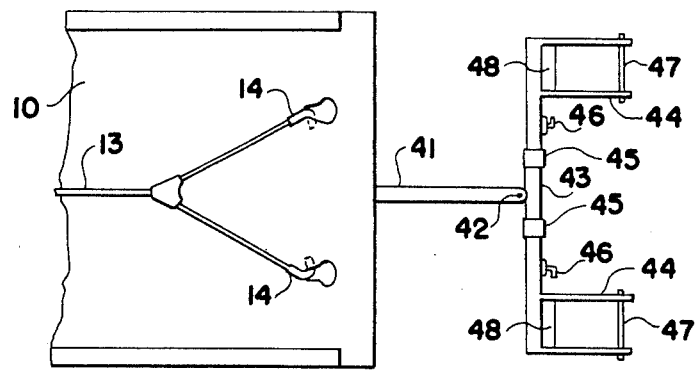
FIG. 4 is a top plan view of the rear end portion of FIG. 1.

The carrier constituting the present invention comprises a self-propelled truck chassis 1 including driver's cab 2 and a frame 3 supported by springs between wheeled front and rear axles of the chassis 1, the rear springs 4 being shackled to the frame 3 and clamped to the rear axle 5 as well known. The frame 3 includes a sub-frame 6 which provides a pivot anchor 7 for the rear end of a double acting cylinder 8 and a downwardly depending rear frame portion 9.

Supported on the frame 3–6 is a car carrier bed 10 which has an upright grilled or screened front portion 11 and a bi-directional hydraulic winch 12 having a cable 13 (see FIG. 4) with car engaging J hooks 14 or the like for loading or unloading a car onto or from said bed 10 when tilted as in FIG. 2. The frame 3–6 also includes a compartment 15 for the hydraulic system components of FIG. 12 such as an engine-driven or electric pump 16, a reservoir 17, solenoid operated three position four way valves 18, 19, and 20 for cylinder 8, winch 12, and cylinder 21 respectively, and, a relief valve 22. The driver's side of the bed 10 may be provided with a switch unit 23 on an extensible coiled electric cable which may be pulled out of compartment 24 for selective operation of the solenoid four way valves 18, 19, and 20.

The bed 10 is linked to the frame 3 by front and rear links 25 and 26, the front link 25 preferably being a relatively wide single link pivotally connected to the bed 10 and frame 3, and the rear link 26 preferably being a pair of spaced apart links pivotally connected as shown in FIG. 9 to the bed 10 and depending portion 9 of frame 3.

The front link 25 has the piston rod of cylinder 8 pivotally connected thereto between its ends. When the bed 10 is in horizontal position on the frame 3, the front link 25 extends downwardly and rearwardly at a relatively small angle from the bed 10, and the rear link 26 extends downwardly and rearwardly at a relatively large angle from the bed 10. When the cylinder 8 is retracted from its FIG. 1 condition to that of FIG. 2, the front end of the bed 10 is shifted upwardly and rearwardly by front link 25 and at the same time the rear end of the bed 10 is shifted rearwardly and downwardly by rear link 26 to ground engaging position as shown in FIG. 2. As aforesaid, when the bed 10 is in tilted position as shown in FIG. 2 a car may be driven onto the bed 10 by its own power or pulled onto the bed 10 by cable 13 of winch 12. When the cylinder 8 is protracted, the bed 10 with a car thereon is shifted from the tilted position of FIG. 2 to the horizontal position of FIG. 1.

A further feature of the present invention is the provision of mechanism for compressing the rear springs 4 as the bed 10 approaches tilted position, said mechanism including a cable sheave 27 on each side of the frame 3 spaced above the rear axle 5 and a cable 28 over said sleeve 27 having its ends connected to the rear axle 5 and to the rear link 26 near its lower pivot. When the bed 10 is in horizontal position as shown in FIG. 1, the cables 28 are in slack condition with the slack being progressively taken up as the bed 10 is moved toward tilted position. When the rear end of bed 10 is several inches from ground-engaging position, the cables 28 become taut so that the remaining terminal portion of the tilting movement of the bed 10 progressively increasingly compresses the rear springs 4.

The compression of the rear springs 4 as aforesaid lowers the frame 3 and its upper rear inclined surface 29 for a smaller angle of inclination of the bed 10 in a tilted position; decelerates the terminal portion of the tilting of the bed 10 and cushions the terminal portion of the retraction of the cylinder 8; assists the initial portion of the protraction of the cylinder 8; and eliminates "spring jump" of the bed 10 when a car is unloaded therefrom. The end of each cable 28 is connected to the respective rear link 26 as by an eye bolt and nut for adjusting the degree of compression of the rear springs 4.

The car carrier herein has a wheel lift assembly 30 for a second car to be towed, said assembly 30 being in retracted condition under the rear end of the bed 10 as shown in FIG. 2 during loading or unloading a car onto or from the bed 10, and being in protracted condition as shown in FIGS. 1 and 3 when it is desired to tow a second car.

Figure 5:
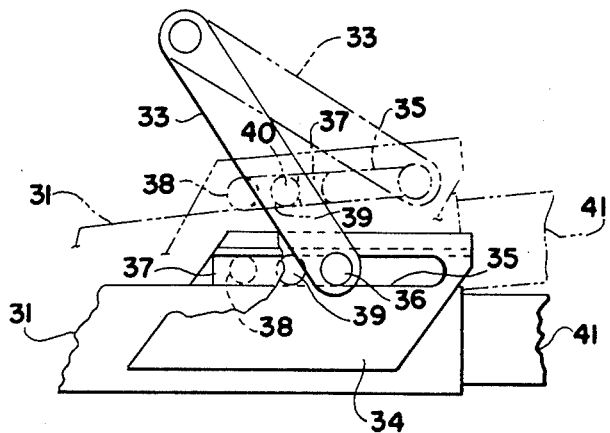
FIG. 5 is an enlarged side elevation view of the rear end portion of the boom housing of the wheel lift assembly showing mechanism for adjusting the height of the boom housing and boom.

The assembly 30 comprises a hollow square boom housing 31 which between its ends is supported by pivot 32 (see FIG. 9) on rear link 26 and which at its rear end is supported by a link 33 having a pivot connection with the bed 10 and a longitudinally adjustable pivot connection with the boom housing 31 to adjust the height of the rear end of the boom housing 31 when the bed 10 is in horizontal position as shown in FIG. 1. As best shown in FIG. 5, the boom housing 31 has welded on opposite sides thereof plates 34 having longitudinal slots 35 in which the axle 36 for support link 33 is slidable. To provide for adjustment of the boom housing 31, the axle 36 has a block 37 which is in the position shown for minimum height adjustment. Each plate 34 has two holes 38 and 39 into either of which a pin 40 may be inserted to provide two further adjustments. In the phantom line position, the pin 40 has been inserted in hole 39 for maximum adjustment.

A boom 41 is slidably telescoped in the boom housing 31 from a retracted position in FIG. 2 to a protracted position in FIGS. 1, 3, and 4. The rear end of the boom 41 has a pivot 42 for the cross bar 43 which carries the wheel lift yokes 44. The yokes 44 and cross bar 43 have telescoped square portions 45 which are held together by spring loaded pins 46 engaged as with grooves in cylindrical shank portions of the cross bar 43. When the pins 46 are disengaged from the cross bar shanks, the yokes 44 may be pulled outwardly to disengage the square portions 45 for indexing or flipping over of the yokes 44 and re-engagement of portions 45 from forwardly extending position (FIG. 2 and phantom line position FIG. 1) to rearwardly extending position (FIGS. 1, 3 and 4).

When it is desired to tow a second car after the first car has been loaded onto and lashed to the bed 10, the boom 41 is unlocked from the boom housing 31 and pulled rearwardly to the FIG. 1 position and locked and the yokes 44 are flipped over 180° from the phantom line position of FIG. 1 to the wheel lift position of FIGS. 1, 3 and 4. If necessary, the wheel engaging bars 47 may be adjusted with respect to the inclined wheel supporting surfaces 48 according to the wheel size of the second car.

The cylinder 8 is then retracted to partially tilt the bed 10 until the yokes 44 engage the ground as shown in FIG. 3. With the yokes 44 in ground engaging position the car carrier and second car are relatively moved so that the yokes 44 are engaged with front or rear wheels of the second car as shown in FIG. 3. If desired the bars 47 may be installed in the proper holes of the yokes 44 when the wheels are engaged with inclined surfaces 48.

The cylinder 8 is then protracted to move the bed 10 to horizontal position as shown in FIG. 1 to lift the front or rear wheels of the second car for towing.

Instead of manually operating the boom 41 as just described, it is preferred to employ the hydraulic cylinder 21 within boom housing 31 and boom 41 (see FIG. 9) with the cylinder pinned at 49 to the boom housing 31 and with the piston rod 50 pinned at 51 to the boom 41.

Figure 6:
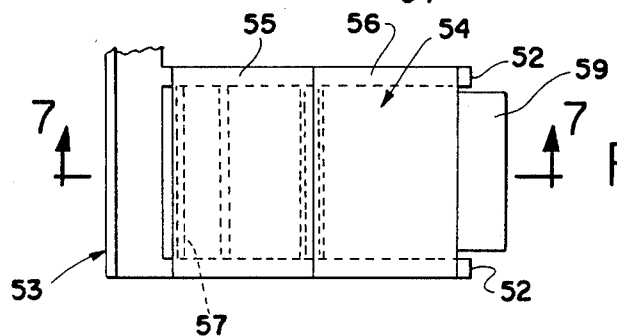
FIG. 6 is a top plan view of a modified form of wheel lift yoke.
Figure 8:
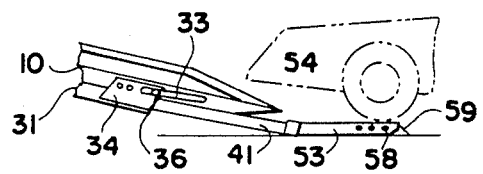
FIG. 8 shows the yoke of FIGS. 6 and 7 employed as a ramp extension of the bed.
Figure 7:
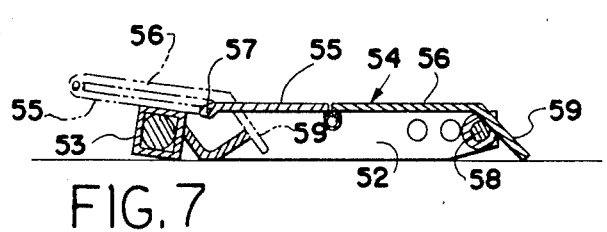
FIG. 7 is a cross-section view along line 7—7 of FIG. 6.

Referring now to FIGS. 6, 7 and 8 the arms 52 of yoke 53 support a ramp 54 composed of hinged together sections 55 and 56 of which section 55 is hinged at 57 to the yoke 53 and of which section 56 is detachably locked to the arms 52 by pin 58 and is provided with inclined ramp portion 59. When the car has a long and low overhang as in FIG. 8, the boom 41 is partially protracted and the bed 10 is partially tilted so that the yoke 53 constitutes an elevated horizontal extension of the bed 10 to cause the overhang to clear the bed 10 when the car is loaded and unloaded from the bed 10. Upon removal of the pin 58, the ramp sections 55 and 58 may be positioned as shown in phantom lines in FIG. 7 for use of the yokes 53 in the same way as yokes 44 with inclined ramp portions 59 being engaged by the wheels of the second car as are the inclined surfaces 48 of yokes 44.

Referring now to FIGS. 12, 13 and 14, the hand held switch unit 23 has a selector switch 60 which selects the winch valve 19 circuit or the wheel lift valve 20 circuit for operation by rocker switch 61 which actuates valve 19 to cause driving of winch 12 to load or unload a car onto or from the bed 10 or which actuates valve 20 to cause cylinder 21 to protract or retract boom 41. The rocker switch 62 actuates valve 18 to cause cylinder 8 to tilt bed 10 or to return bed 10 from tilted position to horizontal position.

The unit 23 also has a speed switch 63 which in conjunction with the device 64 shown in FIG. 14 increases the idling speed of the truck engine for increased output of pump 16. Device 64 comprises a normally closed solenoid operated three way valve 65 having a port connected to the vacuum system of the truck, a port open to atmosphere, and a port communicated with a diaphragm unit 66. When valve 65 is closed both sides of diaphragm 67 are exposed to atmospheric pressure. When valve 65 is energized by switch 63, vacuum on the left side of diaphragm 67 causes the rod or cable 68 which is connected to the engine throttle to be pulled to the left to increase the idling speed of the engine with consequent increased output of pump 16.

During travel of the car carrier with the wheel lift assembly 30 in retracted condition wholly underneath the rear end portion of the bed 10 and with or without a load on the bed 10, the wheels 69 of the load balancing assembly 70 are lifted out of contact with the ground as shown in FIG. 2 and in phantom lines in FIG. 10. However, when a car is towed by the wheel lift assembly 30, the relatively long moment arm imposes a large load on springs 4 and rear axle 5 and wheels and tends to lift the front wheels with consequent lessening of steering control. To counteract this effect of the load acting on the wheel lift assembly 30, the wheels 69 of assembly 70 are lowered into firm contact with the ground as shown in FIGS. 1, 9 and 10 so that even a load on bed 10 and on wheel lift assembly 30, the load on the rear wheels on axle 5 will be substantially decreased. Also, the frame 3 will be substantially level with adequate pressure on the front wheels.

As shown in detail in FIGS. 9, 10 and 11 the load balancing assembly 70 comprises parallel plates 71 bolted as shown in FIGS. 9 and 10 to opposite sides of the downwardly depending rear frame portion 9. Welded to the plates 71 adjacent to their lower front corners is a transverse tube 72 parallel to axle 5 which provides bearings for rearwardly extending arms 73, the arms 73 having adjacent to their rear ends, axles 74 for the load balancing wheels 69. Extending through tube 72 is a torsional spring 75 in the form of a rectangular bar fixed at its middle to tube 72 by pin 76 and fixed at its ends to arms 73 by the pins 77. The plates 71 are provided with brackets 78 spaced above the rear end portions of the arms 73 to which the ends of air bags 79 of rubber-like material are secured.

As known, the truck will be provided with an air compressor and a compressed air storage tank for use in inflating flat tires or for operating various air tools. When air under pressure of say 80 p.s.i. is admitted into bags 79 the wheels 69 will be firmly pressed against the ground to exert say about 5000 pounds upward force on frame 3 thus to lessen the load on axle 5, the springs 75 being twisted as shown in FIG. 11. When the air pressure in bags 79 is released, the spring 75 will be effective to pivot the arms 73 in counterclockwise direction about the axis of tube 72 as viewed in FIGS. 1 and 10 thereby compressing the bags 79 between arms 73 and brackets 78 and lifting the wheels 69 several inches from the ground. The bags 79 may be provided with relief valves (not shown) to permit upward movement of the wheels 69 over curbs or other irregularities into the road.

Admission and release of air into and from the air bags 79 will be controlled by a switch in the driver's cab 2. A hydraulic pump switch in the driver's cab 2 will release air from the air bags 79 so that the wheels 69 will be in raised position during operation of the tilt cylinder 8, the winch 12, and the boom cylinder 21.

The bed 10 herein is of strong lightweight steel construction which weighs approximately the same as known aluminum beds and about 60 percent of known steel beds. Moreover, the tilting action herein is obtained with a 38" tilt cylinder 8 whereas known slide-back beds employ 9' cylinders. The lightweight and strong construction of bed 10 is evident from FIG. 9 wherein the deck 80 is supported by longitudinal frame members 81 and by longitudinal angles 82 welded in V-grooves of strip steel cross members 83 having bottom flanges 84, the deck 80 being bent over the ends of the cross members 83. It is also contemplated to have either or both of the side rails 85 readily removable for side loading of bed 10 with loads on pallets handled by fork lift trucks or the like.

In summary, therefore, it can be seen that the present invention provides a simple, lightweight, and inexpensive car carrier in which a single hydraulic cylinder 8 not only actuates a car carrier bed 10 between horizontal and tilted positions for loading or unloading a first car from the tilted bed 10 but also actuates a wheel lift assembly 23 between ground-engaging and rear or front wheel lifting positions of a second car by movement of the car carrier bed 10 between partially tilted and horizontal positions, the wheel lift assembly 23 being retracted under the rear end portion of the bed 10 during unloading or loading of a first car from or onto the bed 10.

In addition, the present invention provides a load balancing wheel assembly which, when needed, decreases the load on the rear axle and wheels of the truck and maintains adequate loading of the front axle and wheels for proper steering.

What is claimed is:

1. A car carrier comprising a self-propelled truck having a longitudinally extending frame supported by springs on wheeled front and rear axles; a longitudinally extending car carrier bed on said frame having a front end disposed forwardly of said rear axle and a rear end disposed rearwardly of said rear axle and frame; front and rear links pivotally connected to said bed and frame, respectively forwardly and rearwardly of said rear axle; said links, when pivoted in one direction with respect to said frame, being effective to move said bed from horizontal position on said frame to tilted position whereat its front end has been moved upwardly and rearwardly and whereat its rear end has been moved downwardly and rearwardly to ground engaging position for car loading or unloading; actuating means between said frame and the linkage constituted by said bed and links to move said bed between said horizontal and tilted positions; and a wheel lift assembly having a forwardly retracted position beneath the rear end portion of said bed whereat said bed may be actuated between said horizontal and tilted positions, said assembly having a rearwardly protracted position to support the front or rear wheels of a second car above ground for towing; said assembly comprising a boom housing having a front end portion pivotally connected to said rear link between its pivotal connections to said bed and frame; a downwardly extending boom housing support link having its upper and lower ends pivotally connected to the rear end portion of said bed and to the rear end of said boom housing respectively; a boom slidable in said boom housing between said retracted and protracted positions; said boom having a cross bar at its rear end; rotatably indexable wheel engaging yokes on said cross bar which extend forwardly and rearwardly from said cross bar in the respective retracted and protracted positions of said boom; said rearwardly extending yokes in the protracted position of said boom being lowered to ground engaging position by partial rearward tilting motion of said bed by said actuating means for loading or unloading of a second car onto or from said yokes.

2. A car carrier of claim 1 wherein said boom housing has means for longitudinally adjusting the lower end of said support link with respect to its upper end.

3. A car carrier of claim 1 wherein said support link extends substantially horizontally rearward from said boom housing in the retracted position of said assembly and tilted position of said bed.

4. A car carrier of claim 1 wherein said yokes, when indexed in rearwardly extending position, have plates movable to overlying relation on said yokes to constitute elevated horizontal ramp extensions of said bed upon partial protraction of said boom and cross bar and partial tilting of said bed to move said yokes to ground engaging position; said plates having downwardly and rearwardly inclined rear ends to preliminarily raise the wheels and corresponding end of the car being loaded onto said partially tilted bed.

5. A car carrier of claim 1 wherein said frame has a downwardly depending portion rearward of said rear axle; wherein a load balancing wheel assembly is secured to said downwardly depending portion; said wheel assembly having wheels spaced rearward of said rear wheels and supported for movement downwardly from above ground position to ground engaging position; said wheel assembly having means to forcefully move the wheels thereof downwardly into firm ground engaging contact to avoid overlaoding of said rear axle and wheels.

6. A car carrier of claim 5 wherein said means to forcefully move the wheels of said wheel assembly downwardly comprises compressed air bags; wherein said assembly has torsional spring means to raise said wheels of said wheel assembly upon release of air pressure in said bags.

7. A car carrier of claim 1 wherein said frame has a downwardly depending portion rearward of said rear axle; wherein a load balancing wheel assembly is secured to said downwardly depending portion; said assembly comprising parallel plates secured to opposite sides of said downwardly depending portion; a transverse tubular member secured to said plates; said tubular member being parallel to and spaced rearward of said rear axle and having end portions extending transversely beyond said plates; rearwardly extending arms pivotally supported by said end portions and having axles at their rear ends for the wheels of said balancing wheel assembly; said plates having brackets spaced above the rear end portions of said arms; compressed air bags between said brackets and the rear end portions of said arms operative to establish firm ground engaging contact of the wheels of said wheel assembly to avoid overloading of said rear axle and rear wheels; and torsion spring means within said tubular member fixed against rotation at its middle to said tubular member and at its ends to said arms; said spring means being operative to pivot said arms to raise the wheels of said assembly above ground upon release of air pressure in said air bags.

* * * * *